United States Patent [19]

Theron

[11] 4,114,715
[45] Sep. 19, 1978

[54] PIPE, IN PARTICULAR AN EXHAUST PIPE FOR MOTOR VEHICLES

[75] Inventor: Didier Theron, Argenteuil, France

[73] Assignee: Regie Nationale des Usines Renault, Boulogne-Billancourt, France

[21] Appl. No.: 691,481

[22] Filed: Jun. 1, 1976

[30] Foreign Application Priority Data

Jun. 3, 1975 [FR] France .................. 75 17236

[51] Int. Cl.² .................................. B60K 13/04
[52] U.S. Cl. .......................... 180/64 A; 60/322; 138/177
[58] Field of Search ............. 180/64 A; 138/121, 103, 138/106, 177, 178, DIG. 11; 60/322; 181/228, 227, 211, 208, 207

[56] References Cited

U.S. PATENT DOCUMENTS

| 542,801 | 7/1895 | Mannesmann | 138/177 |
| 2,026,446 | 12/1935 | Trott | 180/64 A |
| 2,081,546 | 5/1937 | MacPherson | 180/64 A |
| 3,259,149 | 7/1966 | Curtis et al. | 180/64 A X |
| 3,655,010 | 4/1972 | DuBois | 181/227 |

Primary Examiner—Joseph F. Peters, Jr.
Assistant Examiner—Milton L. Smith
Attorney, Agent, or Firm—Oblon, Fisher, Spivak, McClelland & Maier

[57] ABSTRACT

Pipes undergoing torsion stresses at one fixed extremity, the other extremity being flexibly supported, and in particular, exhaust pipes for motor vehicles. The concentration of stresses at the fixed end are eliminated and distributed in the center of the pipe by reinforcing its moment of inertia and its rigidity at the fixed extremity, and by creating a series of localized zones with a reduced moment of inertia in the center area, where the stresses undergone by the pipe at its fixed end are distributed in limited fashion. The invention is especially applicable to the exhaust pipes of internal combustion engines.

3 Claims, 3 Drawing Figures

PIPE, IN PARTICULAR AN EXHAUST PIPE FOR MOTOR VEHICLES

BACKGROUND OF THE INVENTION

1. Field of the Invention

The present invention relates to a device for reducing the risks of breakage on pipes operating under bending stress, and in particular on the exhaust pipes of motor vehicles when subjected to a bending-shearing moment due to the tilting of the engine during start-up, a frequent occurrence in vehicles with a transverse engine.

2. Description of the Prior Art

The most widely known of such devices for avoiding risks of pipe breakage are generally flexible elements creating the possibility of rotation without high stresses. These flexible elements may be either coupling pipes with a grooved surface, or pipes made from a narrow strip of iron, wound and sealed, imparting a certain flexibility to the pipe.

In general, these devices adapt well and are capable of handling the problem posed, but are quite expensive. The second solution above may also present defects in sealing.

Other solutions consist in limiting the engine clearance directly by means of links. A device of this type is not always adaptable, and is difficult to adjust, given the vibrations transmitted to the chassis of the vehicle.

SUMMARY OF THE INVENTION

The purpose of the present invention is to resolve the problems of breakage on pipes subjected to an alternate twisting moment at their fixed extremity, causing bending of the pipes, there being insufficient clearance for its extremity, due to the presence of obstacles, as in the case of the aforementioned exhaust pipes.

The object of the invention is attained by reducing the high ratio of stress near the fixed end by reinforcing the pipe through an increase in its moment of inertia at this point, then, in order to maintain a slight clearance at the other extremity, in decreasing this moment of inertia progressively while moving away from the fixed extremity by creating flattened areas of local strains while maintaining the same thickness of pipe. Similarly, the thickness of the flattened areas can decrease as a function of the distance away from the fixed end. Their position, number and thickness naturally depend on the value of the maximum bending moment to which the pipe is subjected.

In an exhaust pipe, the local impressed or flattened areas must be progressively linked and have no angular parts so as to prevent disturbances in flow which could be a source of unacceptable external noise.

To this end, the first local flattening is placed as far away as possible from the fixed extremity. The exhaust muffler is advantageously placed between ths initial flattening and the fixed engine connection.

This arrangement, according to the invention, with a normal pipe of constant thickness, regular in shape, makes it possible to avoid using the previously mentioned, expensive devices.

Stress measurements on known devices of this type have demonstrated that only the forward part of the pipe, connected to the engine, is operated at an extremely high rate of alternate torsion strain, the strain of the rear part being almost nil, this situation causing very rapid breakage at the fixed extremity.

With a pipe constructed according to the present invention and having, for example, three impressed or flattened areas, the stress ratio is decreased by 60% at the fixed extremity and is maintained at a constant, low value over almost the entire length of the pipe.

More generally, the object of the invention is attained by a pipe with one fixed extremity undergoing torsion strains, the other extremity having an articulated support, being characterized by reinforcement of its moment of inertia and of its rigidity in the fixed end zone and a series of localized decreases in its moment of inertia in its center area, absorbing therein and distributing in a limited manner therefrom the torsion strains undergone by the pipe at its fixed extremity.

The localized reductions in its moment of inertia are advantageously produced by flattening the circular section of the pipe into an ellipsoidal section progressively connected to the circular section. This arrangement is applicable to any exhaust pipe for a front-engine motor vehicle connecting to the exhaust manifold of said engine and having a flexible point of attachment articulated to the chassis in the rear part of the vehicle.

The reinforcement of the moment of inertia in the zone of attachment to the manifold is achieved by an intermediate fixing sleeve, rigidly affixed to the engine by means of fixing braces. In this solution, according to the invention, the muffler or catalytic converter forming a rigidifying element can be placed on the pipe immediately behind the reinforced fixed extremity. In this way, with an inexpensive device such as this, problems of breakage of pipes on exhaust lines such as these are resolved.

BRIEF DESCRIPTION OF THE DRAWINGS

An example of an embodiment of a pipe according to the invention will be described below, in reference to the attached drawings, in which.

DETAILED DESCRIPTION OF THE PREFERRED EMBODIMENTS

Figure 1:
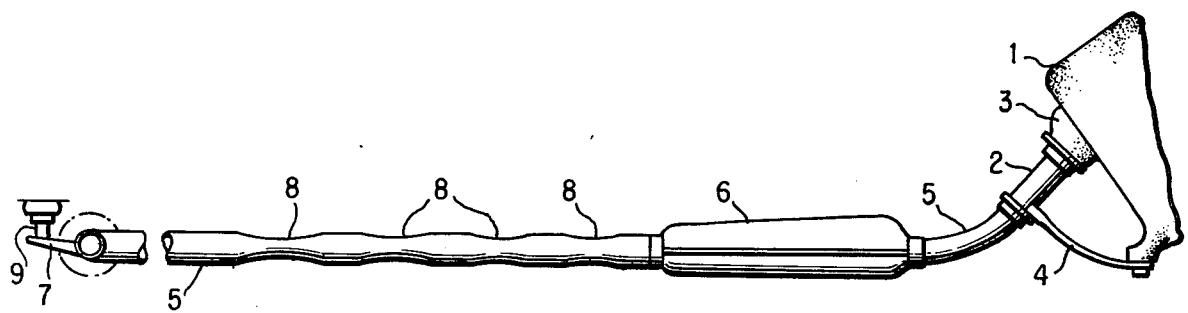
FIG. 1 illustrates an exhaust pipe of the type described herein, being mounted in a front, transverse engine motor vehicle.

FIG. 1 is a partial representation of the contour of a transverse front engine 1 of a motor vehicle, not shown, wherein a fixing element or intermediate sleeve 2 is rigidly mounted on an exhaust manifold 3, which may be reinforced by braces 4 to from a rigid block with engine 1.

This fixing element or intermediate sleeve 2 receives the exhaust pipe 5, which includes a muffler 6 near engine 1, a point of attachment 7 to the chassis, not shown, being provided at its opposite extremity in the rear of the vehicle, and in its center part, a series of local flattenings 8 which decrease the moment of inertia of the pipe 5 within the plane of this decrease, thus favoring, in the example described, the formation of a center of vibrations in the flattened area 8, responding to the torsion vibrations in the more rigid assembly 1, 2, 3, 4 and 6, especially during start-up of the engine 1, without noticeably affecting the point of attachment 7 to which a silent-block 9 lends a certain flexibility, and without causing deterimental concentrations of stresses at connecting part 2.

Thus, contrary to known solutions, which seek by expensive means to increase flexibility in the area near the fixed end of connection to the engine, where risks of breakage occur, the present solution increases rigidity in this zone until alternate torsions are suppressed, the rigid assembly following the movements of the engine and the torsion strains being displaced and distributed along the localized zones of flattening 8, where there is no risk of breakage.

In the example illustrated by FIG. 1, the desired rigidity near engine 1 is also obtained by placing muffler 6 there. This solution is also advantageous for the installation of catalytic converters which must be located at the outlet of the exhaust manifold for collecting gases therefrom at the highest possible temperature.

Figure 2:
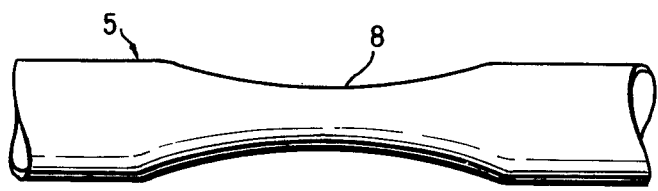
FIG. 2 shows an enlarged close-up of the pipe shown in FIG. 1 at a point of local flattening for decreasing its moment of inertia.
Figure 3:
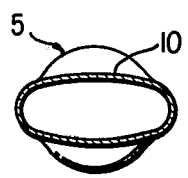
FIG. 3 is a cross-section of the flattening illustrated in FIG. 2.

FIGS. 2 and 3 show, on an enlarged scale, an example of deformation of pipe 5 in order to cause local indentations 8. By pressing the pipe between appropriate forms, crushing is obtained which progressively diminishes from the circular section, giving the ellipsoidal section 10 of FIG. 3. This progressive shape of connection gives maximum reduction of pressure loss and maximum reduction of stray flow noises, while assuring good distribution of bending stresses over the equipment.

Obviously, many modifications and variations of this invention are possible in light of the above teachings. It is therefore to be understood that within the scope of the appended claims, the invention may be practiced otherwise than as specifically described herein.

What is claimed as new and desired to be secured by Letters Patent of the United States is:

1. In an exhaust system of an automotive vehicle, wherein an exhaust pipe is connected at one end to an engine of said vehicle which vibrates during operation and at its other end is flexibly supported by the frame of said vehicle, the improvement comprising:
    means reinforcing the rigidity of the area of the connection of said exhaust to said engine; and
    said exhaust pipe including an elongate axial portion of substantially circular section and having therein a series of localized indentations of said circular section, which are produced by flattenings of the circular section of the pipe into an elipsoidal section progressively connected to the circular section, providing a reduced moment of inertia in its center area, whereby the torsional stresses undergone by said exhaust pipe at its fixed extremity are, in a limited way, absorbed and distributed therein.

2. In an exhaust system of an automative vehicle, wherein an exhaust pipe is connected at one end to an engine of said vehicle which vibrates during operation and at its other end is flexibly supported by the frame of said vehicle, the improvement comprising:
    means for reinforcing the rigidity of the area of the connection of said one end of said exhaust pipe to said engine including an intermediate sleeve connected at one end to the exhaust manifold of said engine and at its other end to said one end of said exhaust pipe, and fixing braces further rigidly connecting said intermediate sleeve to said engine; and
    said exhaust pipe including an elongate axial portion of substantially circular section and having therein a series of localized indentations of said circular section, providing a reduced moment of inertia in its center area, whereby the torsional stresses undergone by said exhaust pipe at its fixed extremity are, in a limited way, absorbed and distributed therein.

3. An exhaust pipe according to claim 2, further comprising a muffler, forming a rigidifying element, connected at one end to the elongate axial portion of said exhaust pipe and at the other end to said intermediate sleeve.

* * * * *